(12) United States Patent
Sun et al.

(10) Patent No.: US 11,808,317 B2
(45) Date of Patent: Nov. 7, 2023

(54) SQUEEZE MODE GIANT ELECTRORHEOLOGICAL FLUID DAMPER

(71) Applicant: Shanghai University, Shanghai (CN)

(72) Inventors: Yi Sun, Shanghai (CN); Ben Lu, Shanghai (CN); Huayan Pu, Shanghai (CN); Min Wang, Shanghai (CN); Jiheng Ding, Shanghai (CN); Wenchuan Jia, Shanghai (CN); Yan Peng, Shanghai (CN); Jun Luo, Shanghai (CN)

(73) Assignee: Shanghai University, Shanghai (CN)

( * ) Notice: Subject to any disclaimer, the term of this patent is extended or adjusted under 35 U.S.C. 154(b) by 0 days.

(21) Appl. No.: 17/893,228

(22) Filed: Aug. 23, 2022

(65) Prior Publication Data
US 2023/0062689 A1    Mar. 2, 2023

(30) Foreign Application Priority Data
Aug. 24, 2021    (CN) .......................... 202110973363.3

(51) Int. Cl.
*F16F 13/00* (2006.01)
*F16F 13/30* (2006.01)
*F16F 9/53* (2006.01)

(52) U.S. Cl.
CPC ........ *F16F 13/007* (2013.01); *F16F 2222/12* (2013.01); *F16F 2224/02* (2013.01);
(Continued)

(58) Field of Classification Search
CPC ...... F16F 13/007; F16F 13/30; F16F 2222/12; F16F 2224/02; F16F 2224/0208;
(Continued)

(56) References Cited

U.S. PATENT DOCUMENTS

| 1,598,923 | A | * | 9/1926 | Mason | .................. F16F 13/007 |
| | | | | | 267/125 |
| 2,916,307 | A | * | 12/1959 | Peters | ...................... F16J 3/048 |
| | | | | | 285/119 |

(Continued)

FOREIGN PATENT DOCUMENTS

| CN | 202381622 | 8/2012 |
| CN | 107687494 | 2/2018 |
| CN | 108006147 | 5/2018 |

*Primary Examiner* — Robert A. Siconolfi
*Assistant Examiner* — James K Hsiao
(74) *Attorney, Agent, or Firm* — THORPE NORTH AND WESTERN, LLP; David W. Osborne

(57) ABSTRACT

A squeeze mode giant electrorheological fluid damper is disclosed. The squeeze mode giant electrorheological fluid damper comprises a support, a container and a connecting structure, wherein the support comprises a bottom plate, guide shafts and a top plate, the guide shaft is vertically fixed on the bottom plate, and the top plate is slidably arranged on the guide shaft; the container comprises a container body and two spiral spring pieces coaxially arranged in the container body, the container body is fixed on the bottom plate, the bottoms of the two spiral spring pieces are fixed to the bottom of the container, the two spiral spring pieces are not in contact with each other and are spaced by 180°; the top of the connecting structure is fixedly connected with the top plate, and the bottom of the connecting structure is fixedly connected with the tops of the two spiral spring pieces.

9 Claims, 4 Drawing Sheets

(52) U.S. Cl.
CPC . *F16F 2224/0208* (2013.01); *F16F 2224/043* (2013.01); *F16F 2228/066* (2013.01); *F16F 2230/0052* (2013.01); *F16F 2232/08* (2013.01)

(58) Field of Classification Search
CPC ........... F16F 2224/043; F16F 2228/066; F16F 2230/0052; F16F 2232/08; F16F 9/53
See application file for complete search history.

(56) References Cited

U.S. PATENT DOCUMENTS

| | | | | |
|---|---|---|---|---|
| 4,005,858 A * | 2/1977 | Lochner | ................ | F16F 13/08 267/152 |
| 4,351,515 A * | 9/1982 | Yoshida | ................ | F16F 9/535 267/225 |
| 4,509,730 A * | 4/1985 | Shtarkman | ............ | F16F 13/002 267/152 |
| 4,773,632 A * | 9/1988 | Hartel | ..................... | F16F 13/30 267/141.1 |
| 4,790,522 A * | 12/1988 | Drutchas | .................. | F16F 9/46 188/266.2 |
| 4,838,581 A * | 6/1989 | Oda | ........................ | F28F 21/04 285/422 |
| 5,005,326 A * | 4/1991 | Ishimaru | ............... | E04H 9/0215 248/580 |
| 5,012,740 A * | 5/1991 | Hardt | .................... | H01H 35/142 102/216 |
| 5,462,361 A * | 10/1995 | Sato | ................... | B23Q 11/0032 188/267 |
| 5,497,861 A * | 3/1996 | Brotz | ...................... | F16F 13/30 267/140.5 |
| 5,590,746 A * | 1/1997 | Brotz | ...................... | F16F 13/30 188/267.1 |
| 5,873,438 A * | 2/1999 | Osterberg | ................. | F16F 7/10 384/126 |
| 5,979,618 A * | 11/1999 | Sieg | .......................... | F16F 1/40 188/322.19 |
| 5,979,882 A * | 11/1999 | Osterberg | .............. | F16F 9/103 267/221 |
| 6,029,783 A * | 2/2000 | Wirthlin | .................. | F16F 9/532 188/267.1 |
| 6,129,185 A * | 10/2000 | Osterberg | .............. | F16F 9/103 188/267.2 |
| 6,385,327 B1 * | 5/2002 | D'Hoogh | .............. | H04R 9/043 181/171 |
| 7,140,081 B2 * | 11/2006 | Browne | .................... | F16B 5/07 24/442 |
| 7,971,397 B2 * | 7/2011 | Georgakis | ............ | E04H 9/0215 52/167.2 |
| 8,313,296 B2 * | 11/2012 | Jolly | ..................... | B64C 27/001 416/61 |
| 10,208,828 B2 * | 2/2019 | Gaudet | .................... | F16F 9/512 |
| 10,457,107 B2 * | 10/2019 | Lindemann | .......... | B60G 15/063 |
| 11,002,335 B2 * | 5/2021 | Ghosh | .................. | F01D 25/164 |
| 2003/0071187 A1 * | 4/2003 | Herren | ................ | F16F 15/0275 248/638 |
| 2005/0199455 A1 * | 9/2005 | Browne | ................ | F16F 9/466 188/266.4 |
| 2012/0161579 A1 * | 6/2012 | Browne | ................ | F03G 7/065 60/527 |
| 2018/0009475 A1 * | 1/2018 | Khoury | .................. | B62D 7/144 |
| 2018/0066390 A1 * | 3/2018 | Yu | ........................... | D06F 37/24 |
| 2018/0180131 A1 * | 6/2018 | Inoue | .................... | F16F 7/1011 |
| 2019/0162267 A1 * | 5/2019 | Barber | ................... | F16F 9/53 |
| 2020/0086708 A1 * | 3/2020 | Cervantes | ............. | F16F 9/19 |
| 2020/0102996 A1 * | 4/2020 | Kurabayashi | ......... | F16F 15/022 |

* cited by examiner

SQUEEZE MODE GIANT ELECTRORHEOLOGICAL FLUID DAMPER

CROSS REFERENCE TO RELATED APPLICATION

This patent application claims the benefit and priority of Chinese Patent Application No. 202110973363.3, filed on Aug. 24, 2021, the disclosure of which is incorporated by reference herein in its entirety as part of the present application.

TECHNICAL FIELD

The present disclosure relates to the technical field of vibration reduction dampers, in particular to a squeeze mode giant electrorheological fluid damper.

BACKGROUND ART

The electrorheological fluid, as a novel smart material, shows a special rheological effect. Namely, when no electric field exists in the fluid, particles in the electrorheological fluid are distributed in disorder. Macroscopically, the electrorheological fluid shows a Newtonian fluid. When an electric field is applied to the fluid, the particles in the fluid are polarized and orderly distributed and arranged within milliseconds, and the electrorheological fluid is converted into a solid-like form from a Newtonian fluid macroscopically. When the electric field applied to the fluid is set to zero, the original disordered distribution of the particles in the fluid is recovered, the electrorheological fluid is converted into a Newtonian fluid from a solid-like form, and the whole process is reversible and high in response speed. Meanwhile, different degrees of solid-like forms can be realized by controlling the voltage. The giant electrorheological fluid is similar to the electrorheological fluid in properties, the rheological property of the giant electrorheological fluid is multiple times better than that of the electrorheological fluid, and the giant electrorheological fluid belongs to a reinforced electrorheological fluid.

Based on the characteristics of the giant electrorheological fluid, the giant electrorheological fluid is especially popular in the field of vibration reduction, and is a solid choice for manufacturing a vibration reduction damper. Compared with a traditional damper, the giant electrorheological fluid damper has the advantages of being small in size, small in occupied space, high in damping adjustable adaptability, excellent and stable in performance and the like. Although an existing giant electrorheological fluid damper is superior to a traditional damper, the existing giant electrorheological fluid damper still has the defects, such as a multilayer squeeze mode giant electrorheological fluid damper provided by the patent number CN107687494. According to the damper, a plurality of electrodes are connected with a cylinder wall through list superposition, the instability of equipment is increased, and meanwhile the hidden dangers of liquid leakage and electric leakage exist. Moreover, the existing giant electrorheological fluid damper has the defects of low damping utilization rate, complex structure, incapability of being used independently and the like.

SUMMARY

The present disclosure aims to provide a squeeze mode giant electrorheological fluid damper which outputs a stable and controllable damping force a high giant electrorheological fluid utilization rate under the conditions of small size and no dependence on additional rigid elements.

In order to achieve the purpose, the present disclosure provides the following scheme.

A squeeze mode giant electrorheological fluid damper is disclosed, comprising:

a support, the support comprising a bottom plate, guide shafts and a top plate, the guide shaft being vertically fixed to the bottom plate, and the top plate being slidably arranged on the guide shaft; one of the bottom plate and the top plate is used for being connected with a fixed platform, and the other one is used for being connected with a load to receive vibration energy;

a container, the container comprising a container body and two spiral spring pieces coaxially arranged in the container body, the container body being fixed to the bottom plate, the bottoms of the two spiral spring pieces being fixed to the bottom of the container, and the two spiral spring pieces being not in contact with each other and are spaced by 180°; the container body is made of an insulating material and used for accommodating the giant electrorheological fluid; and the spiral spring piece is made of a conductive material, and the two spiral spring pieces are used for being connected with a positive electrode and a negative electrode respectively to generate an electric field; and a connecting structure, the top of the connecting structure being fixedly connected with the top plate, the bottom of the connecting structure being fixedly connected with the tops of the two spiral spring pieces, and the connecting structure being made of an insulating material.

Preferably, the support further comprises guide shaft supports and linear bearings, the guide shaft support is fixed on the bottom plate, the bottom of the guide shaft is fixed on the guide shaft support, the linear bearing is fixed on the top plate, and the guide shaft is slidably connected with the linear bearing.

Preferably, the connecting structure comprises a connecting shaft support, a connecting shaft and a connecting plate, the connecting shaft support is fixed on the top plate, the connecting plate is fixedly connected with the tops of the two spiral spring pieces at the same time, the top of the connecting shaft is fixedly connected with the connecting shaft support, and the bottom of the connecting shaft is fixedly connected with the connecting plate.

Preferably, the container comprises an upper container cover and a lower container bottom plate, the upper container cover is fixed on the lower container bottom plate, the lower container bottom plate is fixed on the bottom plate, and the connecting structure passes through the upper container cover.

Preferably, the bottom plate and the lower container bottom plate are of an integrated structure.

Preferably, the lower surface of the upper container cover is provided with a boss used for being in limited contact with the inner side wall of the lower container bottom plate.

Preferably, a first wire passing hole, a second wire passing hole and a wire passing groove are formed in the bottom of the lower container bottom plate, the first wire passing hole is used for allowing a first wire to pass through, the second wire passing hole is used for allowing a second wire to pass through, and the wire passing groove is used for allowing the first wire and the second wire to be embedded; and the first wire and the second wire are respectively used for connecting the two spiral spring pieces with the positive electrode and the negative electrode of an external power supply.

Preferably, the container body and the connecting structure are both made of polyformaldehyde plastics.

Preferably, the spiral spring piece is made of copper.

Compared with the prior art, the present disclosure has the following technical effects.

Additional rigid devices are needed when an existing giant electrorheological fluid damper works. However, the spiral spring piece used by the squeeze mode giant electrorheological fluid damper belongs to a spring device, certain rigidity can be provided, and the giant electrorheological fluid damper can be kept working near a balance position. Therefore, the giant electrorheological fluid damper can work independently without additional rigid devices, and is small in size. Therefore, the squeeze mode giant electrorheological fluid damper can output a stable and controllable damping force a high giant electrorheological fluid utilization rate under the conditions of small size and no dependence on additional rigid elements.

BRIEF DESCRIPTION OF THE DRAWINGS

To more clearly illustrate the embodiment of the present disclosure or the technical scheme in the prior art, the following briefly introduces the attached figures to be used in the embodiment. Apparently, the attached figures in the following description show merely some embodiments of the present disclosure, and those skilled in the art may still derive other drawings from these attached figures without creative efforts.

Reference signs in attached figures: 1, lower container bottom plate; 2, guide shaft support; 3, guide shaft; 4, linear bearing; 5, top plate; 6, connecting shaft support; 7, connecting shaft; 8, upper container cover; 9, connecting plate; 10, spiral spring piece; and 11, giant electrorheological fluid.

DETAILED DESCRIPTION OF THE EMBODIMENTS

The following clearly and completely describes the technical scheme in the embodiments of the present disclosure with reference to the attached figures in the embodiments of the present disclosure. Apparently, the described embodiments are merely a part rather than all of the embodiments of the present disclosure. Based on the embodiment in the present disclosure, all other embodiments obtained by the ordinary technical staff in the art under the premise of without contributing creative labor belong to the scope protected by the present disclosure.

The present disclosure aims to provide a squeeze mode giant electrorheological fluid damper which outputs a stable and controllable damping force a high giant electrorheological fluid utilization rate under the conditions of small size and no dependence on additional rigid elements.

To make the foregoing objective, features and advantages of the present disclosure clearer and more comprehensible, the present disclosure is further described in detail below with reference to the attached figures and specific embodiments.

Figure 1:
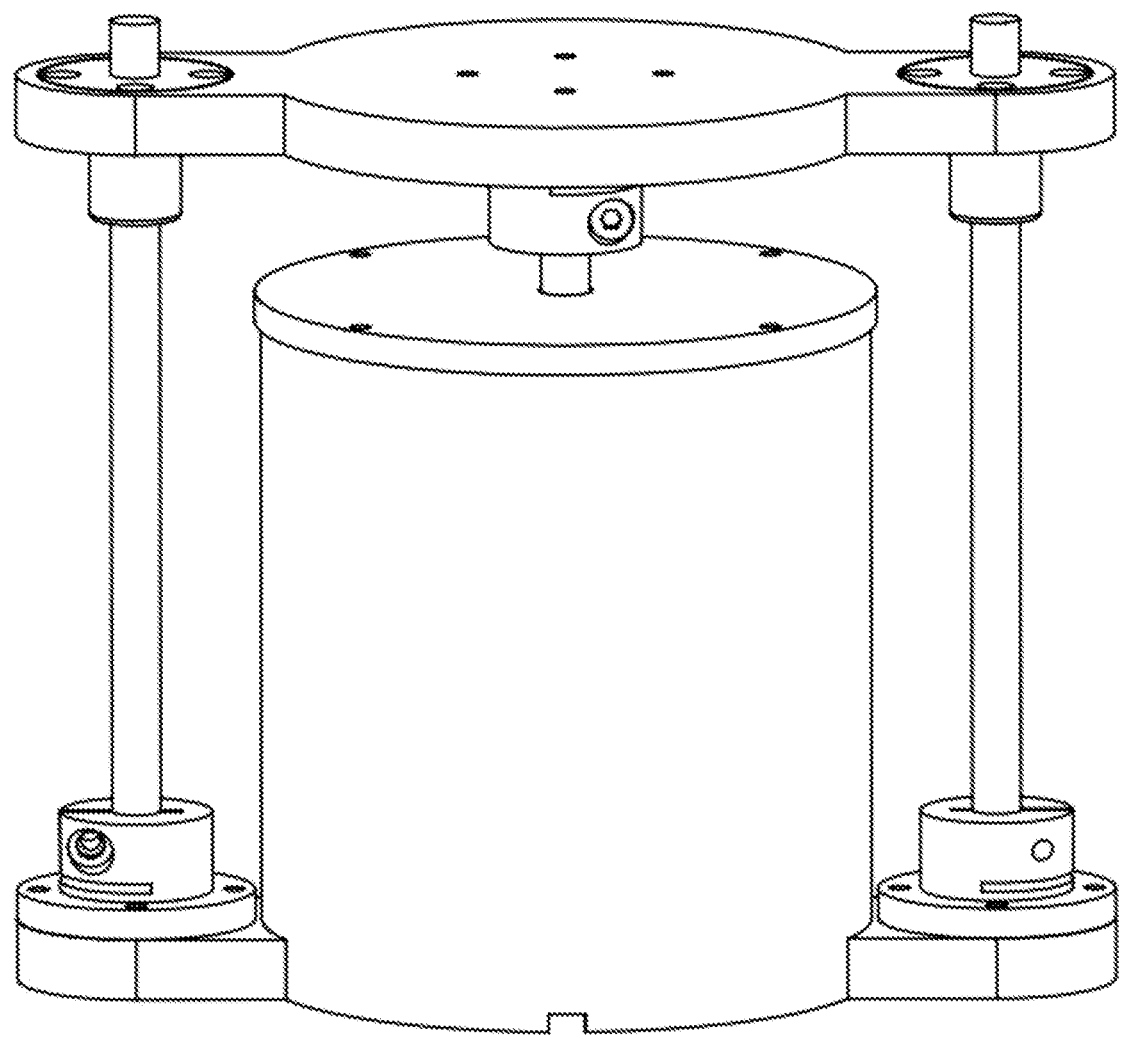
FIG. 1 is an external structural schematic diagram of a squeeze mode giant electrorheological fluid damper in the embodiment.
Figure 2:
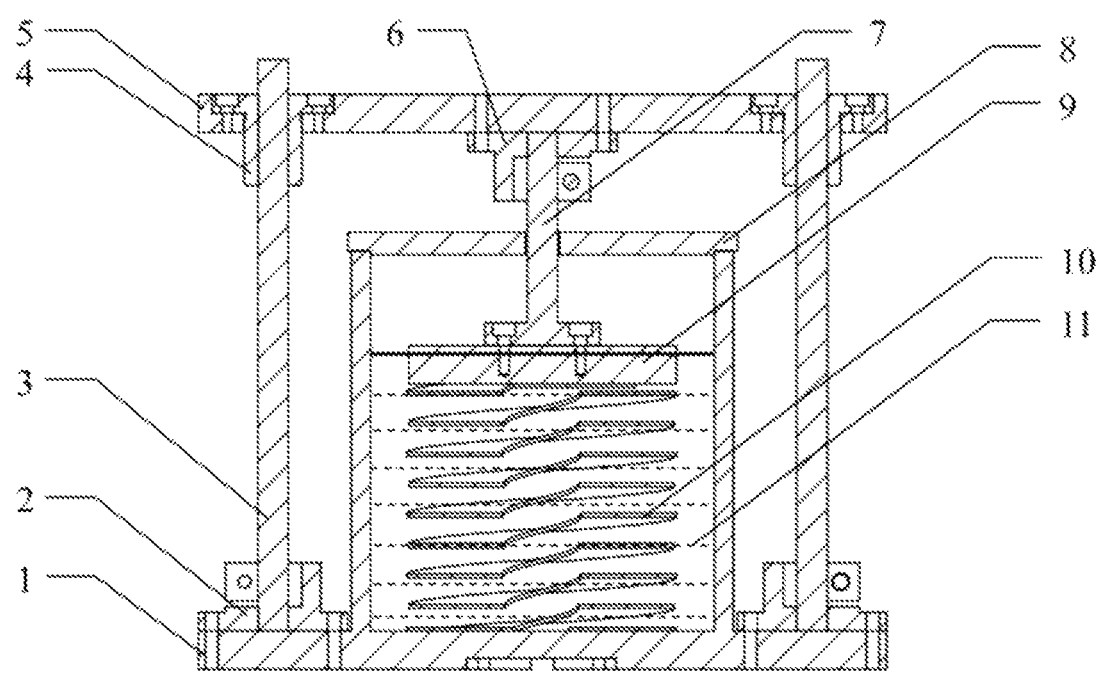
FIG. 2 is an internal structural schematic diagram of a squeeze mode giant electrorheological fluid damper in the embodiment.
Figure 3:
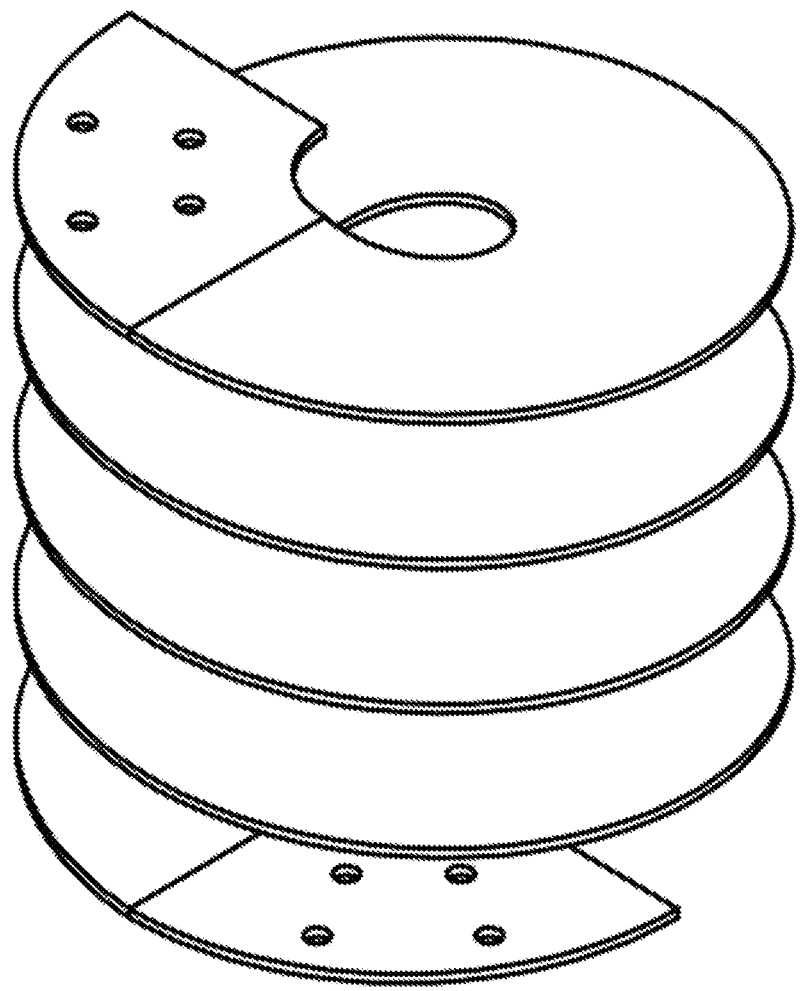
FIG. 3 is a structural schematic diagram of a spiral spring piece.
Figure 4:
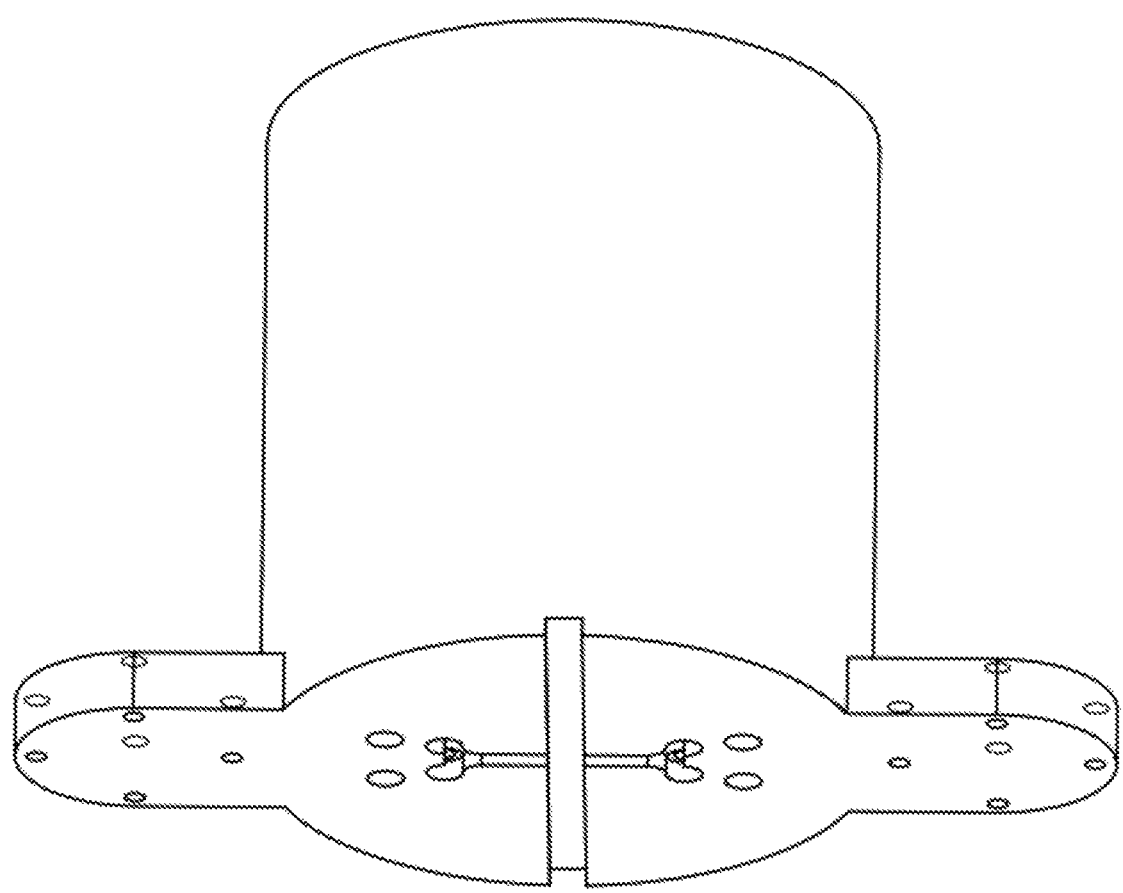
FIG. 4 is a structural schematic diagram of a lower container bottom plate.

As shown in FIG. 1 to FIG. 4, the embodiment provides a squeeze mode giant electrorheological fluid damper, comprising a support, a container and a connecting structure.

Wherein, the support comprises a bottom plate, guide shafts 3 and a top plate 5, the guide shaft 3 is vertically fixed on the bottom plate, and the top plate 5 is slidably arranged on the guide shaft 3. one of the bottom plate and the top plate 5 is used for being connected with a fixed platform, and the other one is used for being connected with a load. When the load and the fixed platform move relatively, the support can receive vibration energy. The container comprises a container body and two spiral spring pieces 10 coaxially arranged in the container body, the container body is fixed on the bottom plate, the bottoms of the two spiral spring pieces 10 are fixed to the bottom of the container, and the two spiral spring pieces 10 are not in contact with each other and are spaced by 180°. The container body is made of an insulating material and used for accommodating a giant electrorheological fluid 11. The spiral spring piece 10 is made of a conductive material, and the two spiral spring pieces 10 are used for being connected with a positive electrode and a negative electrode respectively to generate an electric field. After the two spiral spring pieces 10 are connected with the positive electrode and the negative electrode of an external power supply respectively, the electric field is generated between the two spiral spring pieces 10, and therefore the damping characteristic of the giant electrorheological fluid 11 is changed. The top of the connecting structure is fixedly connected with the top plate 5, the bottom of the connecting structure is fixedly connected with the tops of the two spiral spring pieces 10, and the connecting structure is made of an insulating material.

The working principle of the squeeze mode giant electrorheological fluid damper is as follows.

When relative displacement is generated between the fixed platform and the load, namely vibration is generated, it is assumed that the fixed platform is fixed as a reference point, the load generates displacement, and the displacement is transmitted to the spiral spring piece 10 through the connecting structure. When the load moves downwards, the spiral spring piece 10 is squeezed. At the moment, on one hand, the spiral spring piece 10 generates elastic force after being squeezed, and the direction of the elastic force is opposite to the moving direction of the load; on the other hand, the two spiral spring pieces 10 serve as two polar plates, the distance between the two polar plates is reduced, the giant electrorheological fluid 11 between the two polar plates works in the squeeze mode, the fluid is squeezed towards the two sides, and damping force opposite to the load displacement direction is generated. The elastic force and the damping force are superposed to jointly reduce the downward movement speed of the load. When the downward displacement of the load is maximum, the speed is zero. Then, due to the elastic force of the spiral spring piece 10, the load can be restored to the initial position. In the restoration process, the two spiral spring pieces 10 serve as two polar plates, the distance between the two polar plates is increased, the giant electrorheological fluid 11 between the two polar plates works in the squeeze mode, the fluid is squeezed into the space between the two polar plates, damping force opposite to the displacement direction is generated, and vibration energy is consumed. When the load moves upwards, the spiral spring piece 10 is stretched, damping force can be generated as well, vibration energy is consumed, and therefore vibration reduction is achieved. The length of the connecting structure cannot be too long, so that short circuit caused by too close distance when the two spiral spring pieces 10 are compressed can be avoided.

The specific forms of the support are various, and those skilled in the art can select the support according to actual needs as long as the support can be connected with the fixed platform and the load so as to receive vibration energy. In the embodiment, the support further comprises guide shaft supports 2 and linear bearings 4. The guide shaft support 2 is fixed on the bottom plate, the bottom of the guide shaft 3 is fixed on the guide shaft support 2, the linear bearing 4 is fixed on the top plate 5, and the guide shaft 3 is slidably connected with the linear bearing 4. The moving direction of the top plate 5 is limited in the axis direction of the guide shaft 3 through the linear bearing 4 on the guide shaft 3, so that the stability of the structure is enhanced.

In the embodiment, the connecting structure comprises a connecting shaft support 6, a connecting shaft 7 and a connecting plate 9. The connecting shaft support 6 is fixed on the top plate 5, the connecting plate 9 is fixedly connected with the tops of the two spiral spring pieces 10 at the same time, the top of the connecting shaft 7 is fixedly connected with the connecting shaft support 6, and the bottom of the connecting shaft 7 is fixedly connected with the connecting plate 9. According to the difference of the actual needs, those skilled in the art may also select other forms of connecting structures as long as the load can move synchronously with the top of the spiral spring piece 10.

In the embodiment, the container comprises an upper container cover 8 and a lower container bottom plate 1. The upper container cover 8 is fixed on the lower container bottom plate 1, the lower container bottom plate 1 is fixed on the bottom plate, and the connecting structure passes through the upper container cover 8. In the embodiment, the bottom plate and the lower container bottom plate 1 are of an integrated structure, and the bottom plate and the lower container bottom plate 1 can be formed at a time, so that the processing efficiency is improved, and the processing cost is reduced.

In order to prevent the upper container cover 8 from being separated from the lower container bottom plate 1, the lower surface of the upper container cover 8 is provided with a boss used for being in limited contact with the inner side wall of the lower container bottom plate 1 in the embodiment. The movement of the upper container cover 8 in the radial direction (the direction perpendicular to the container axis) is limited through limited contact of the boss and the inner side wall of the lower container bottom plate 1. A sealing gasket is preferably arranged between the boss and the inner wall of the lower container bottom plate 1 so as to reduce the possibility of liquid leakage.

In the embodiment, a first wire passing hole, a second wire passing hole and a wire passing groove are formed in the bottom of the lower container bottom plate 1, the first wire passing hole is used for allowing a first wire to pass through, the second wire passing hole is used for allowing a second wire to pass through, and the wire passing groove is used for allowing the first wire and the second wire to be embedded, so that the first wire and the second wire are convenient to lead out. The first wire and the second wire are respectively used for connecting the two spiral spring pieces 10 with the positive electrode and the negative electrode of the external power supply. After the first wire and the second wire are installed, a gap between the first wire and the first wire passing hole needs to be sealed, and a gap between the second wire and the second wire passing hole needs to be sealed, so that the giant electrorheological fluid 11 is prevented from being leaked.

In the embodiment, the container body and the connecting structure are both made of polyformaldehyde plastics. Those skilled in the art can select other insulating materials as long as electric leakage can be prevented. The spiral spring piece 10 can be made of copper or other common conductive materials.

It should be noted that "top" and "upper", which refer to the orientation, in the embodiment have the same meaning and correspond to the upper in FIG. 1 to FIG. 4, and "bottom" and "lower", which refer to the orientation, in the embodiment have the same meaning and correspond to the lower in FIG. 1 to FIG. 4.

Specific examples are used for illustration of the principles and implementation methods of the present disclosure. The description of the above-mentioned embodiments is used to help illustrate the method and the core principles of the present disclosure; and meanwhile, those skilled in the art can make various modifications in terms of specific embodiments and scope of application in accordance with the teachings of the present disclosure. In conclusion, the content of this specification shall not be construed as a limitation to the present disclosure.

What is claimed is:

1. A squeeze mode giant electrorheological fluid damper, comprising:
    a support, the support comprising a bottom plate, guide shafts and a top plate, the guide shafts being vertically fixed on the bottom plate, and the top plate being slidably arranged on the guide shafts; wherein one of the bottom plate and the top plate is used for being connected with a fixed platform, and another one of the bottom plate and the top plate is used for being connected with a load to receive vibration energy;
    a container, the container comprising a container body and two spiral spring pieces coaxially arranged in the container body, the container body being fixed on the bottom plate, the bottoms of the two spiral spring pieces being fixed to a bottom of the container, and the two spiral spring pieces being not in contact with each other and being spaced by 180°; wherein the container body is made of an insulating material and used for accommodating an electrorheological fluid with reinforced rheological property; and each of the two spiral spring pieces is made of a conductive material, and the two spiral spring pieces are used for being connected with a positive electrode and a negative electrode respectively to generate an electric field; and
    a connecting structure, a top of the connecting structure being fixedly connected with the top plate, a bottom of the connecting structure being fixedly connected with tops of the two spiral spring pieces, and the connecting structure being made of an insulating material.

2. The squeeze mode giant electrorheological fluid damper according to claim 1, wherein the support further comprises guide shaft supports and linear bearings, the guide shaft supports are fixed on the bottom plate, a bottom of each of the guide shafts is fixed on a corresponding one of the guide shaft supports, the linear bearings are fixed on the top plate, and each of the guide shafts is slidably connected with a corresponding one of the linear bearings.

3. The squeeze mode giant electrorheological fluid damper according to claim 1, wherein the connecting structure comprises a connecting shaft support, a connecting shaft and a connecting plate, the connecting shaft support is fixed on the top plate, the connecting plate is fixedly connected with tops of the two spiral spring pieces at same time, a top of the connecting shaft is fixedly connected with the connecting shaft support, and a bottom of the connecting shaft is fixedly connected with the connecting plate.

4. The squeeze mode giant electrorheological fluid damper according to claim 1, wherein the container comprises an upper container cover and a lower container bottom plate, the upper container cover is fixed on the lower container bottom plate, the lower container bottom plate is fixed on the bottom plate, and the connecting structure passes through the upper container cover.

5. The squeeze mode giant electrorheological fluid damper according to claim 4, wherein each of the bottom plate and the lower container bottom plate is of an integrated structure.

6. The squeeze mode giant electrorheological fluid damper according to claim 4, wherein a lower surface of the upper container cover is provided with a boss used for being in limited contact with an inner side wall of the lower container bottom plate.

7. The squeeze mode giant electrorheological fluid damper according to claim 4, wherein a first wire passing hole, a second wire passing hole and a wire passing groove are formed in a bottom of the lower container bottom plate, the first wire passing hole is used for allowing a first wire to pass through, the second wire passing hole is used for allowing a second wire to pass through, and the wire passing groove is used for allowing the first wire and the second wire to be embedded; and the first wire and the second wire are respectively used for connecting the two spiral spring pieces with the positive electrode and the negative electrode of an external power supply.

8. The squeeze mode giant electrorheological fluid damper according to claim 1, wherein the container body and the connecting structure are both made of polyformaldehyde plastics.

9. The squeeze mode giant electrorheological fluid damper according to claim 1, wherein each of the two spiral spring pieces is made of copper.

* * * * *